United States Patent
Goenueldinc

(10) Patent No.: US 8,215,703 B2
(45) Date of Patent: Jul. 10, 2012

(54) PASSENGER MOTOR VEHICLE WITH REAR-SIDE AIR GUIDING DEVICE

(75) Inventor: Okan Goenueldinc, Ostfildern (DE)

(73) Assignee: Dr. Ing. h.c.f. Porsche Aktiengesellschaft (DE)

(*) Notice: Subject to any disclaimer, the term of this patent is extended or adjusted under 35 U.S.C. 154(b) by 0 days.

(21) Appl. No.: 13/007,037

(22) Filed: Jan. 14, 2011

(65) Prior Publication Data

US 2011/0169298 A1 Jul. 14, 2011

(30) Foreign Application Priority Data

Jan. 14, 2010 (DE) .................. 10 2010 004 560

(51) Int. Cl.
*B62D 35/00* (2006.01)
(52) U.S. Cl. ...................... 296/180.1; 296/180.5
(58) Field of Classification Search ..... 296/180.1–180.5
See application file for complete search history.

(56) References Cited

U.S. PATENT DOCUMENTS

| | | | | |
|---|---|---|---|---|
| 1,895,750 A * | 1/1933 | Brown | ................... | 180/89.1 |
| 3,455,594 A * | 7/1969 | Mrlik et al. | ................ | 296/180.5 |
| 4,558,898 A * | 12/1985 | Deaver | ................... | 296/180.1 |
| 4,773,692 A * | 9/1988 | Schleicher et al. | ......... | 296/180.5 |
| 4,845,600 A * | 7/1989 | Matsumura et al. | ......... | 362/547 |
| 6,007,143 A * | 12/1999 | Lehmann et al. | ........... | 296/180.1 |
| 6,382,708 B1 * | 5/2002 | Erdelitsch et al. | .......... | 296/180.5 |
| 6,814,395 B1 * | 11/2004 | Lin | ............... | 296/180.1 |
| 7,036,871 B2 * | 5/2006 | Adams | .................. | 296/180.1 |
| 7,111,898 B2 * | 9/2006 | Rinklin | ................. | 296/180.1 |
| 7,201,432 B2 * | 4/2007 | Roth | ..................... | 296/180.5 |
| 7,220,032 B2 * | 5/2007 | Mori | ..................... | 362/541 |
| 7,264,300 B2 * | 9/2007 | Hillgaertner | ............... | 296/180.5 |
| 7,287,798 B2 * | 10/2007 | King | ...................... | 296/57.1 |
| 7,347,485 B1 * | 3/2008 | Saunders | ................. | 296/180.5 |
| 7,380,870 B2 * | 6/2008 | Froeschle et al. | .......... | 296/180.5 |
| 7,387,330 B2 * | 6/2008 | Froeschle et al. | .......... | 296/180.5 |
| 7,399,026 B2 * | 7/2008 | Froeschle et al. | .......... | 296/180.5 |
| 7,578,543 B2 * | 8/2009 | Wegener et al. | ........... | 296/180.5 |
| 7,708,335 B2 * | 5/2010 | Wegener | ................. | 296/180.5 |
| 8,113,571 B2 * | 2/2012 | Goenueldinc | .............. | 296/180.5 |
| 2007/0228773 A1 * | 10/2007 | Froeschle et al. | .......... | 296/180.5 |
| 2011/0169298 A1 * | 7/2011 | Goenueldinc | .............. | 296/180.1 |
| 2011/0169299 A1 * | 7/2011 | Goenueldinc | .............. | 296/180.5 |
| 2011/0285168 A1 * | 11/2011 | Roemer et al. | ............. | 296/180.5 |

FOREIGN PATENT DOCUMENTS

DE 197 41 321 12/1998

* cited by examiner

*Primary Examiner* — Glenn Dayoan
*Assistant Examiner* — Gregory Blankenship
(74) *Attorney, Agent, or Firm* — Gerald E. Hespos; Michael J. Porco

(57) ABSTRACT

An air guiding device (8) is mounted in the rear end (2) of a passenger motor vehicle (1) and a setting-out mechanism (7) is connected to the underside of the air guiding device (8) for moving the air-guiding device (8). A collar (14) with a streamlined profile extends from the air guiding device (8) and surrounds the setting-out mechanism (7). Thus, the end of the setting-out mechanism (7) that faces toward the air guiding device (8) is concealed, and there is an optimum flow around the setting-out mechanism (7) in the region of the setting-out mechanism (7) when the air guiding device (8) is deployed.

18 Claims, 3 Drawing Sheets

PASSENGER MOTOR VEHICLE WITH REAR-SIDE AIR GUIDING DEVICE

CROSS-REFERENCE TO RELATED APPLICATION

This application claims priority under 35 USC 119 to German Patent Application No. 10 2010 004 560.8, filed on Jan. 14, 2010, the entire disclosure of which is incorporated herein by reference.

BACKGROUND OF THE INVENTION

1. Field of the Invention

The invention relates to a passenger motor vehicle having an air guiding device designed as a wing or spoiler blade and mounted in the rear end of the vehicle. The air guiding device can be moved relative to the rear end by means of a setting-out mechanism that is connected to the underside of the air guiding device.

2. Description of the Related Art

A wing or spoiler blade can be deployed from a retracted position when the passenger motor vehicle reaches a relatively high speed. The movable wing or spoiler may also be pivotable. However, such an exposed joint is a problem with regard to design and aerodynamics. The wing or spoiler blade may be mounted directly to the setting-out mechanism without a pivot joint. However, design and aerodynamic problems exist with respect to flow around the setting out mechanism when the wing or spoiler blade is in the deployed position.

The joint or the connecting region of the setting-out mechanism and air guiding device are partially visible when the air guiding device is deployed. It is basically undesirable for components that connect the setting-out mechanism and air guiding device to be visible because these components do not meet either stylistic or aerodynamic requirements. The design of these components is substantially predefined based on their technical function, and hence it is virtually impossible to make significant modifications for design and for aerodynamics. Large amounts of effort have been expended to obtain small optimizations, such as a special, inconspicuous coloring of the setting-out mechanism or of the joint, or else the encasement of the components by in a bellows.

DE 197 41 321 A1 discloses a passenger motor vehicle with an air guiding device with a fastening part. The fastening device has a tubular section and an adjoining plate-shaped section that is connected to the setting-out mechanism. The tubular section is screwed to the setting-out mechanism and further screws serve to connect the plate-shaped section to a threaded plate that is embedded into the rear wing of the passenger motor vehicle.

The mounting of the air guiding device disclosed in DE 197 41 321 A1 is extremely complex. These complexities are due to the design of the rear wing with an embedded threaded plate and the special design of the fastening part, which permits only rigid and therefore not articulated mounting of the wing or spoiler in the setting-out mechanism.

It is an object of the invention to refine a passenger motor vehicle so that the end of the setting-out mechanism that faces toward the air guiding device is concealed, and when the air guiding device is deployed, there is an optimum flow around the setting-out mechanism in the region of the setting-out mechanism.

SUMMARY OF THE INVENTION

The object is achieved in by providing a collar with a streamlined profile on the underside of the air guiding device in the region of the setting-out mechanism. The collar is directed away from the air guiding device and surrounds the setting-out mechanism.

The passenger motor vehicle thus has the collar in the connecting region of the setting-out mechanism and the air guiding device or in the region of a joint between the setting-out mechanism and air guiding device. The collar surrounds and therefore hides the connecting region. Additionally, the collar surrounding the connecting region is configured to provide a streamlined incident flow in the connecting region of the air guiding device and setting-out mechanism when the air guiding device is deployed. The collar may be a lip that permits a particularly good flow around the air guiding device in the region of the attachment of the setting-out mechanism to the wing or spoiler blade.

The collar also can function to conceal any joint that may be provided, such as a joint that permits adjustment of an angle of the wing or spoiler blade.

The invention is particularly advantageous for a passenger motor vehicle with a joint that is recessed into the profile of the wing or spoiler blade. Here, the available installation space is used to accommodate the joint. This concept can be used both for a closed wing or spoiler blade and also for a multi-shell wing or spoiler blade.

The air guiding device preferably has a downwardly open depression. The setting-out mechanism preferably is mounted in the downwardly open depression of the air guiding device and/or the joint is accommodated in the depression.

The collar may be integral or unitary with the wing or spoiler blade, or may be attached as a separate component to the wing or spoiler blade.

The cross section of the downwardly open depression preferably corresponds to the outer cross section of the collar. Furthermore, the outer contour of the collar preferably is slightly smaller than the inner contour of the depression. Thus, the collar may be plugged into the depression with a small degree of play and connected thereto. A matched cross-sectional design of the depression and collar also is advantageous in the case of a single-piece design of the wing or spoiler blade and collar. It is particularly expedient if the collar has a constant cross section over its length. Thus, the collar can be produced in a simple and cheap manner.

The collar preferably has a droplet-shaped cross section to ensure a good flow around the wing or spoiler blade in the region of the attachment of the setting-out mechanism to the deployed wing or spoiler blade. The cross section of the collar preferably widens initially and subsequently tapers in the incident-flow direction of the collar. The flow profile of the collar therefore corresponds approximately to the profile of a symmetrical aircraft wing.

The collar can be produced simply and cheaply as a tube. Here, the collar may be formed in one piece with the wing or spoiler blade, for example by virtue of the collar being turned up from the wing or spoiler blade. Alternatively, the collar may be a separate part, for example a clip-on part. The collar may be formed from sheet-metal part or plastic.

The cross section of the collar preferably substantially matches the cross section of the setting-out mechanism. The setting-out mechanism may have a substantially circular cross section, and accordingly the setting-out mechanism preferably extends through the collar with a small degree of play in the widened cross-sectional region of the collar. The cross-sectional area required for the collar therefore is larger than the cross-sectional area of the setting-out mechanism only by an insignificant amount, which is particularly preferable from a flow aspect and an aerodynamic design.

The setting-out mechanism preferably is connected pivotably to the air guiding device. More particularly, the setting-out mechanism preferably is connected to the wing or spoiler blade by a joint arranged in the depression. The joint preferably is received entirely by the depression.

The passenger motor vehicle is designed so that the air guiding device is mounted by two setting-out mechanisms that are arranged at a distance from one another in the transverse direction of the passenger motor vehicle. The setting-out mechanisms preferably are arranged in the end regions of the air guiding device.

Further features of the invention will emerge from the appended drawings and from the description of the preferred embodiment depicted in the drawing, without the invention being restricted thereto.

DETAILED DESCRIPTION OF THE PREFERRED EMBODIMENT

Figure 1:
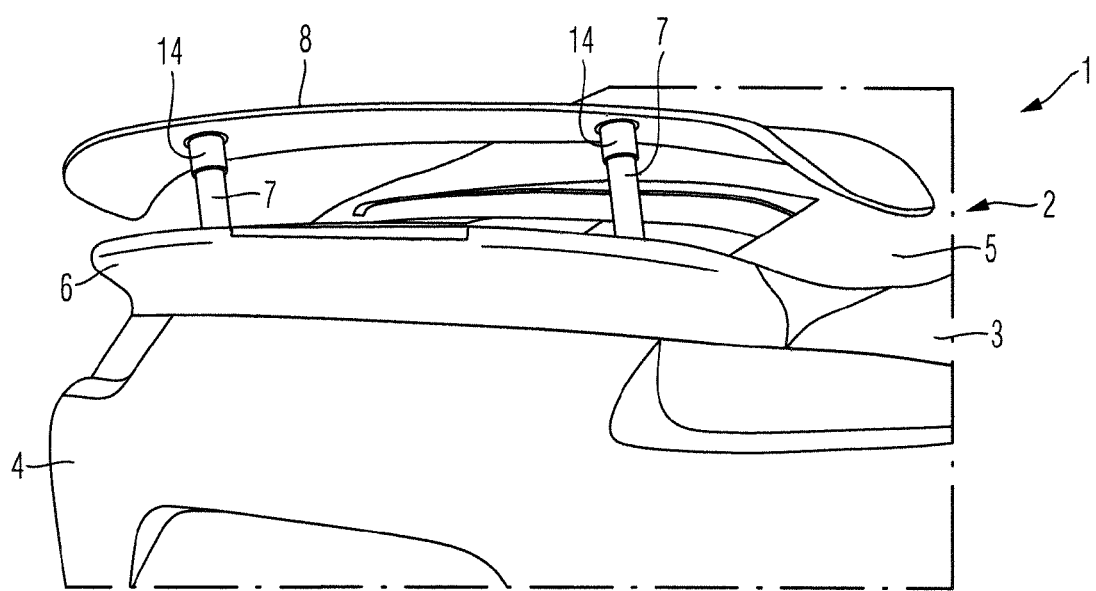
FIG. 1 is a rear view of the passenger motor vehicle according to the invention in the region of the vehicle rear end, with the air guiding device deployed.

A passenger motor vehicle in accordance with the invention is identified by the numeral 1 in FIG. 1. The passenger motor vehicle 1 has a rear end 2, a body 3 between a rear bumper 4 and a tailgate 5 and a rear spoiler 6 that extends in the transverse direction of the vehicle 1. Two setting-out mechanisms 7 extend through the rear spoiler 6. An actuating means (not illustrated) mounted in the rear end 2 functions to raise and lower the setting-out mechanisms 7, and thereby deploys and retracts the air guiding device, which is a wing 8. The retracted wing 8 rests on the rear spoiler 6. When the passenger motor vehicle 1 reaches relatively high speeds, the wing 8 is moved into the deployed and raised position shown in FIG. 1.

Figure 3:
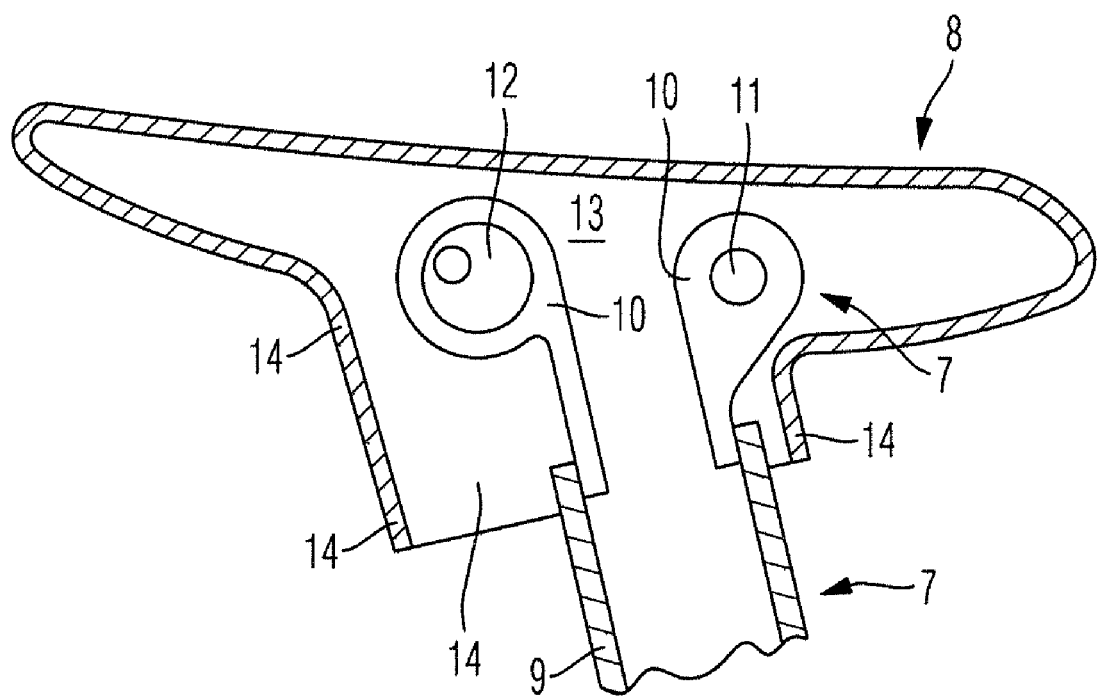
FIG. 3 is a section through the air guiding device in the region of a setting-out mechanism and through that end of the setting-out mechanism that faces towards the air guiding device.

FIG. 3 shows the mounting of the wing 8 to the upper end of one of the setting-out mechanisms 7, with the mounting to the other setting-out mechanism 7 being substantially identical. More particularly, the upper end of the setting-out mechanism 7 is defined by a setting-out mechanism tube 9 that is circular in cross section and that can be raised and lowered. A joint 10 is connected to the setting-out mechanism tube 9. A front end of the joint 10 with respect to the normal direction of travel of the passenger motor vehicle 1 is mounted for pivoting the wing 8 about an axle 11 that is stationary with respect to the wing 8. The rear of the joint 10 is mounted in the wing 8 for articulation by means of an adjustable eccentric 12. Thus, the attack angle of the wing 8 can be varied by the eccentric 12.

The wing 8 has downwardly open depressions 13 that receive the respective joints 10 and the upper end regions of the setting-out mechanism tubes 9.

Figure 2:
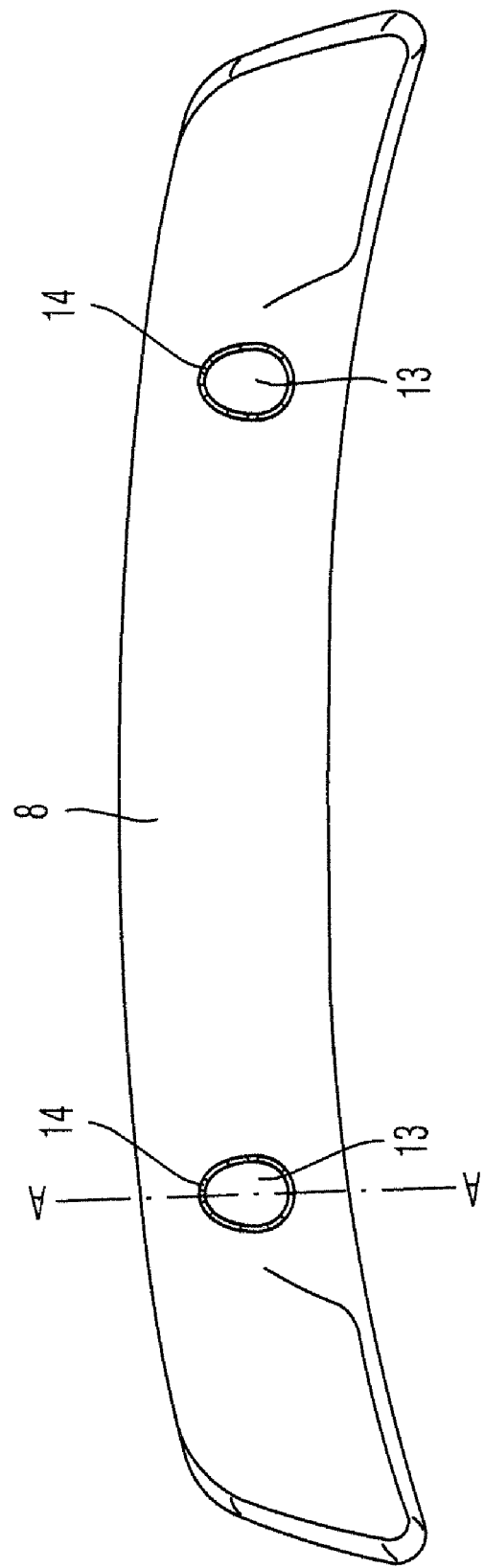
FIG. 2 is the air guiding device in a view from below.

Collars 14 are provided on the underside of the wing 8 in the regions of the respective setting-out mechanisms 7. The collars 14 are directed away from the wing 8 and surround the upper ends of the setting-out mechanism 7 including the joints 10 and the ends of the setting-out mechanism tubes 9 that face toward the joint 10. The collar 14 has a streamlined profile, as shown in FIG. 2. More particularly, the collar 14 has a droplet-shaped cross section that widens and subsequently tapers in the incident-flow direction of the collar 14. The collar 14 has a constant cross section over its length and is formed as a straight tube. As shown in FIG. 3, the collar 14 and the wing 8 form one unitary component, and preferably is a plastic molded part.

The cross section of the collar 14 is selected in view of the cross section of the setting-out mechanism tube 9. In particular, the setting-out mechanism tube 9 has a substantially circular cross section and is surrounded by the widened cross sectional region of the collar 14 with a small degree of play. More particularly, the collar 14 surrounds the setting-out mechanism tube 9 with a minimal spacing and tapers in the direction away from the setting-out mechanism tube 9 to provide the optimum flow cross section of the collar 14.

The passenger motor vehicle 1 of the invention ensures that the end of the setting-out mechanism 7 that faces towards the wing 8 is concealed by the collar 14 even when the setting-out mechanism 7 is deployed. Accordingly, there is an optimum flow around the collar 14, and therefore around the setting-out mechanism 7.

What is claimed is:

1. A passenger motor vehicle having an air guiding device mounted in a rear end of the vehicle and moveable relative to the rear end by at least one setting-out mechanism connected to an underside region of the air guiding device, characterized in that the underside region of the air guiding device in proximity to the setting-out mechanism includes a collar directed away from the air guiding device and surrounding the setting-out mechanism, the collar having a streamlined profile, the setting-out mechanism being connected pivotably to the air guiding device.

2. The vehicle of claim 1, characterized in that the air guiding device is a wing or spoiler blade.

3. The vehicle of claim 2, wherein the collar and the air guiding device form one unitary component.

4. The vehicle of claim 1, wherein the setting-out mechanism is mounted in a downwardly open depression of the air-guiding device.

5. The vehicle of claim 4, wherein the setting-out mechanism is connected to the air guiding device by a joint arranged in the depression.

6. The vehicle of claim 4, wherein a cross section of the depression substantially corresponds to a cross section of the collar facing toward the depression.

7. The vehicle of claim 1, wherein the collar has a substantially constant cross section along its length.

8. The vehicle of claim 1, wherein the collar has a droplet-shaped cross section.

9. The vehicle of claim 8, wherein the cross section of the collar initially widens and subsequently tapers in an incident-flow direction of the collar.

10. The vehicle of claim 1, wherein the collar is a tube.

11. The vehicle of claim 1, wherein the at least one setting-out mechanism comprises two spaced apart setting-out mechanisms arranged at end regions of the air guiding device.

12. A passenger motor vehicle, comprising: an air guiding device mounted in a rear end of the vehicle and moveable relative to the rear end by at least one setting-out mechanism connected to an underside region of the air guiding device, the underside region of the air guiding device in proximity to the setting-out mechanism including a collar directed away from the air guiding, the setting-out mechanism having a substantially circular cross section and the setting-out mechanism extending through the collar with a small degree of play in a widened cross-sectional region of the collar.

13. A passenger motor vehicle having a rear end and opposite left and right sides, a wing mounted at the rear end of the vehicle and extending from the left side toward the right side, the wing having an underside facing to the vehicle, left and right tubular collars extending from the underside of the wing and having streamlined profiles, left and right setting-out mechanisms passing into the tubular collars and connected pivotably to the underside of the wing, the setting out mechanisms being operative for moving the wing toward and away from the vehicle.

14. The vehicle of claim 13, wherein the collar is unitary with the wing.

15. The vehicle of claim 13, wherein the setting-out mechanism is connected pivotably to the wing by a joint inwardly of the collar.

16. The vehicle of claim 13, wherein the collar has a droplet-shaped cross section.

17. The vehicle of claim 16, wherein the cross section of the collar initially widens and subsequently tapers in an incident-flow direction of the collar.

18. The vehicle of claim 17, wherein the collar is a tube.

\* \* \* \* \*